(12) United States Patent
Jackson et al.

(10) Patent No.: US 7,921,880 B2
(45) Date of Patent: Apr. 12, 2011

(54) THREE-WAY POPPET VALVE WITH INTERMEDIATE PILOT PORT

(75) Inventors: Randall S. Jackson, Burlington, WI (US); Anthony Casale, Wauconda, IL (US); Jeff Oligmueller, Swisher, IA (US)

(73) Assignee: HydraForce, Inc., Lincolnshire, IL (US)

( * ) Notice: Subject to any disclaimer, the term of this patent is extended or adjusted under 35 U.S.C. 154(b) by 892 days.

(21) Appl. No.: 11/894,075

(22) Filed: Aug. 20, 2007

(65) Prior Publication Data

US 2009/0050222 A1 Feb. 26, 2009

(51) Int. Cl.
 *F16K 11/24* (2006.01)
(52) U.S. Cl. ..................................... 137/881; 251/30.04
(58) Field of Classification Search .................. 137/870, 137/881; 251/30.04, 38, 41
See application file for complete search history.

(56) References Cited

U.S. PATENT DOCUMENTS

| | | | | |
|---|---|---|---|---|
| 2,398,907 | A * | 4/1946 | McCune | 251/41 |
| 4,699,351 | A * | 10/1987 | Wells | 251/38 |
| 5,979,484 | A * | 11/1999 | Grando et al. | 137/870 |
| 6,267,350 | B1 | 7/2001 | Slawinski et al. | |
| 6,328,275 | B1 | 12/2001 | Yang et al. | |
| 6,745,992 | B2 * | 6/2004 | Yang et al. | 251/30.03 |
| 6,789,570 | B2 | 9/2004 | Beyrak et al. | |
| 6,805,155 | B2 | 10/2004 | Slawinski et al. | |
| 7,063,100 | B2 | 6/2006 | Liberfarb | |
| 7,069,945 | B2 | 7/2006 | Slawinski et al. | |
| 7,117,895 | B2 * | 10/2006 | Koyama | 137/881 |
| 7,137,406 | B2 | 11/2006 | Slawinski et al. | |
| 7,341,236 | B2 * | 3/2008 | Stephenson et al. | 251/30.04 |

OTHER PUBLICATIONS

HydraForce, "Solenoid Valves" SVCV08-20 Poppet, 2-Way, Normally Closed, commercially available in the U.S. prior to Aug. 20, 2007 (2 pages).
HydraForce, "Electro-Proportional Valves"—Directional Control, SP10-20 Poppet, 2-Way, Normally Closed, commercially available in the U.S. prior to Aug. 20, 2007 (2 pages).
SweetHaven Publishing Services "Basic Hydraulics," retrieved at http://64.78.42.182/sweethaven/MechTech/hydraulics01/moduleMain.asp?whichMod=0502 Apr. 23, 2007 (14 pages).
SimHydraulics, "Pilot-Operated Check Valve," retrieved at http://www.mathworks.com/acess/helpdesk/help/toolbox/physmod/hydro/ref/pilotoperate Apr. 23, 2007 (4 pages).
SimHydraulics, "Check Valve," retrieved at http://www.mathworks.com/access/helpdesk/help/toolbox/physmod/hydro/ref/checkvalve Apr. 23, 2007 (4 pages).
SimHydraulics, "2-Way Directional Valve," retrieved at http://www.mathworks.com/access/helpdesk/help/toolbox/physmod/hydro/ref/2waydirect Apr. 23, 2007 (6 pages).
SimHydraulics, "Modeling Directional Valves," retrieved at http://mathworks.com/access/helpdesk/helo/toolbox/physmod/hydro/ug/bgpnejx-2.ht Apr. 23, 2007 (8 pages). The MathWorks, SimHydraulics "Pilot-Operated Check Valve," retrieved at http://www.mathworks.com/access/helpdesk/help/toolbox/physmod/hydro/index.html?/acc Apr. 23, 2007 (4 pages).
HydraForce, Solenoid Valves, SV12-28 Poppet, 2-Way, N.C., Bi-Directional Blocking, commercially available in the U.S. prior to Aug. 20, 2007 (2 pages).

* cited by examiner

*Primary Examiner* — John Fox
(74) *Attorney, Agent, or Firm* — Leydig, Voit & Mayer, Ltd.

(57) ABSTRACT

An integrated three-way poppet valve is disclosed with an intermediate pilot port and an integral load holding check valve. The valve incorporates a reverse flow check poppet for load hold capability, which enables a lower cost solution compared to a combination of valves of similar functionality. A control method is also disclosed using an integrated three-way poppet valve to control the flow of hydraulic oil to a cylinder, hydraulic motor, or other hydraulic device in proportion to the amount of a current applied to a solenoid coil. Depending on the current applied, the valve blocks all flow or else permits flow from one inlet port to two outlet ports proportional to the current applied.

18 Claims, 5 Drawing Sheets

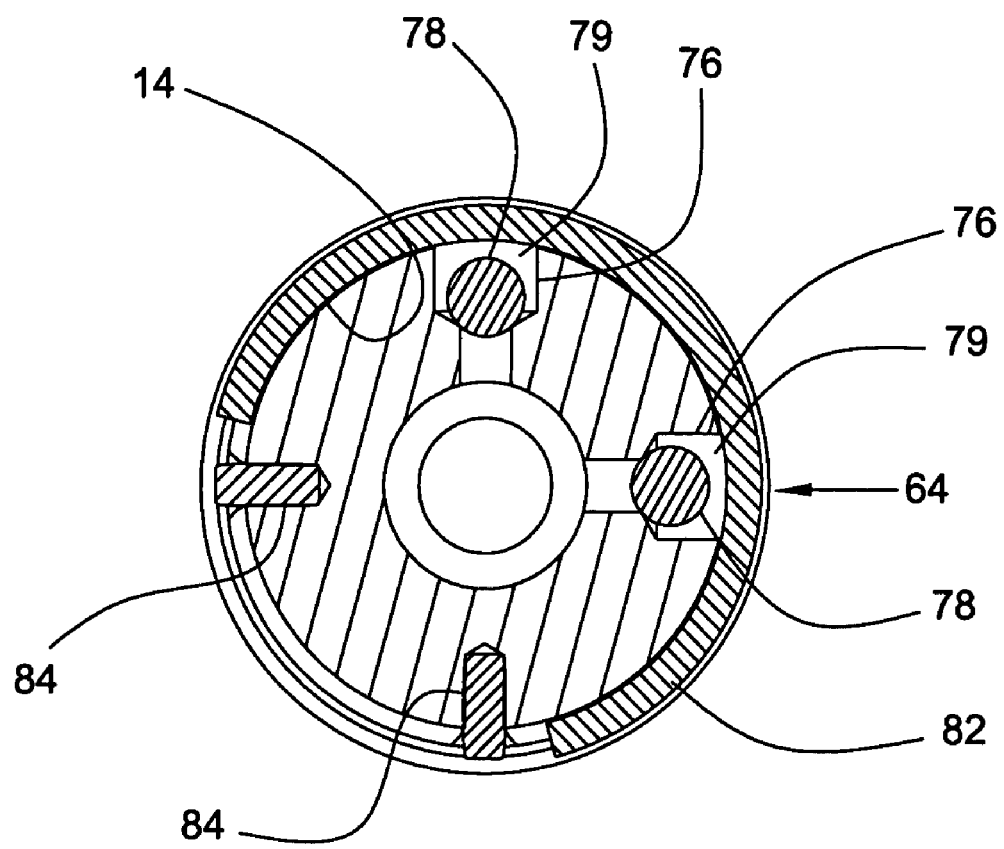

THREE-WAY POPPET VALVE WITH INTERMEDIATE PILOT PORT

FIELD OF THE INVENTION

The present invention relates generally to valves and, more particularly, to three-way pilot-operated flow control valves.

BACKGROUND OF THE INVENTION

Flow control valves can be used to regulate fluid flow through piping systems and the like. Proportional flow control valves can provide a regulated flow rate that is proportional to a control signal. A proportional flow control valve can include a regulating spool moveable by a solenoid to obtain an adjustable opening. A proportional valve can come in several different styles, such as, a surface-mounted valve, a sectional valve, and a cartridge-style valve, for example. In addition to a proportional valve, a pressure compensator can be used in a hydraulic system to provide a fairly constant flow over a range of pressures induced by different loads.

Systems of spool valves or poppet valves are known that use additional (or non-integral) check valves for load holding and load sensing/piloting. Other prior valve designs provide integral load holding capability by using check balls in poppets, such as that shown in and described in U.S. Pat. No. 6,328,275, but such designs can have multiple leak paths. Also known is a reverse flow check valve design used in a two-way, or on/off, valve, such as is commercially available from HydraForce, Inc. of Lincolnshire, Ill., as model number SVCV08-20, for example.

A continuing need exists for a three-way valve with a lowered leakage possibility and with inherent load holding capability. Additionally, a continuing need exists for economical solutions to the problem of finding integrated valve solutions that result in lower total costs when compared to a combination of valves with similar functionalities.

BRIEF SUMMARY OF THE INVENTION

In accordance with the foregoing, a novel valve is provided. In an embodiment of the invention, an integrated three-way poppet valve is provided with an intermediate pilot port. The valve provides an integral pilot signal for operating a secondary piloted valve, such as a counterbalance valve or flow regulator, for example, and an integral load holding check valve. The pilot signal can be used as a load sense signal to actuate a load sense pump or other pump control device, for example. The valve can incorporate a reverse flow check poppet for load hold capability. The valve can enable a lower cost solution compared to a combination of conventional valves of similar functionality.

In another embodiment of the invention, a control method is provided using an integrated three-way poppet valve to control the flow of hydraulic oil to a cylinder, hydraulic motor, or other hydraulic device in proportion to the amount of a current applied to a solenoid coil. Depending on the current applied, the valve blocks all flow or else permits flow from an inlet port to a pair of outlet ports proportional to the current applied, wherein the flow from one outlet port can be used to pilot another valve and the flow from the other outlet port can be used to control a cylinder, hydraulic motor, or some other hydraulic device.

In another embodiment of the invention, an integrated three-way poppet valve is provided with an integral pilot signal and a reverse flow check poppet for load holding capability, wherein the check poppet is spring loaded to urge the check poppet to a closed position at low pressure and has only one leak path.

Other features of the invention are described in, and will be apparent from the following description and the annexed drawings.

BRIEF DESCRIPTION OF THE DRAWINGS

FIG. 2 is a cross-sectional view taken along line 2-2 in FIG. 1.

DETAILED DESCRIPTION OF EMBODIMENTS OF THE INVENTION

The invention solves the problem of providing a lower cost valve when compared to a combination of valves with similar functionality. An embodiment of the valve can provide an integral pilot signal for operating a secondary piloted valve, such as a counterbalance valve or flow regulator, and an integral load holding check valve. The pilot signal can also be used as a load sense signal to actuate a load sense pump or other pump control device. The valve can incorporate a reverse flow check poppet for load hold capability. In at least one embodiment of the invention, the check poppet is spring loaded to close the check poppet at low pressure. Various embodiments of the present invention are described in more detail below with reference to the drawings.

Figure 1:
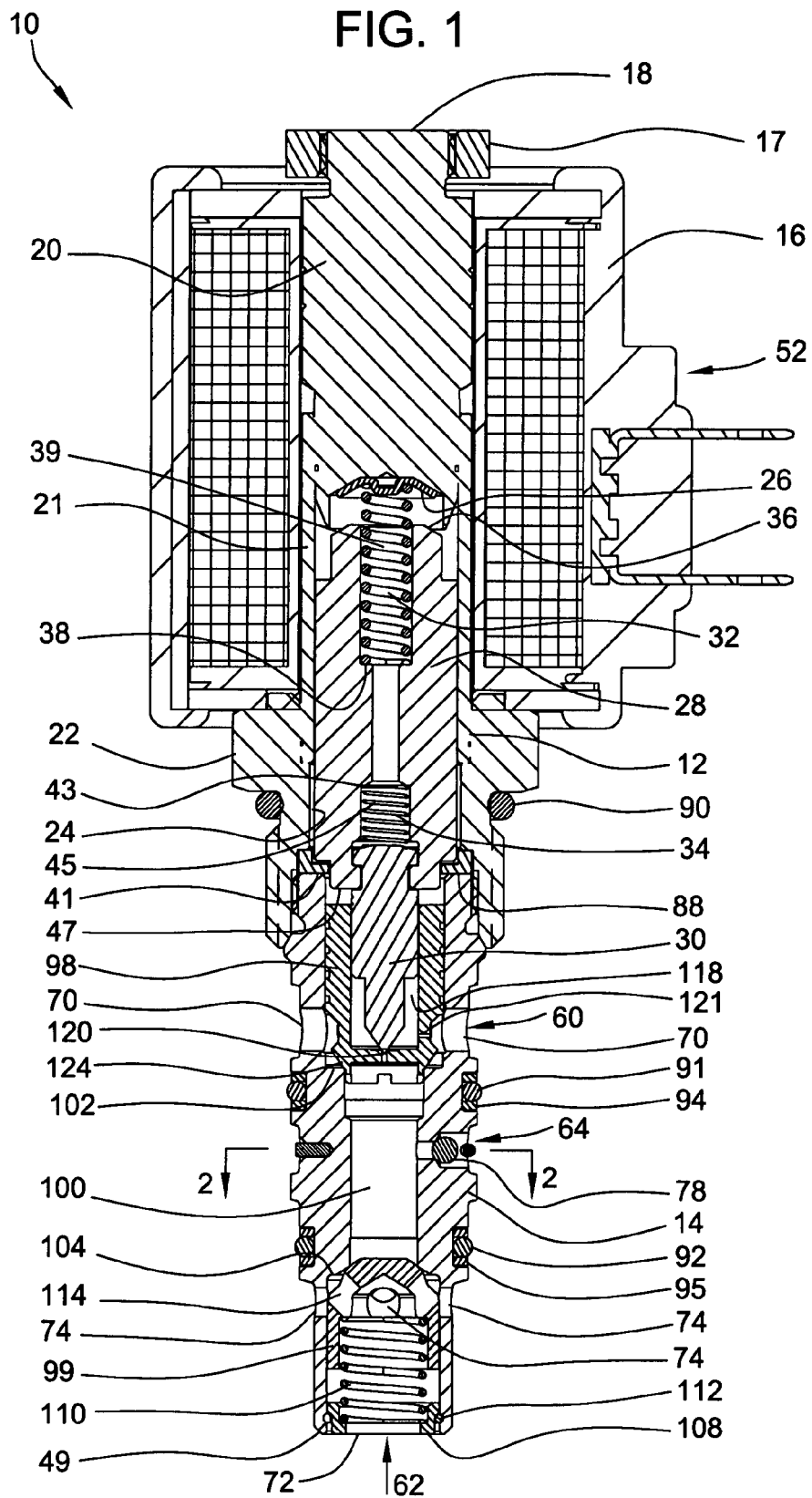
FIG. 1 is cross section through a three-way poppet valve with intermediate pilot port according to an embodiment of the present invention.

Referring to FIG. 1, an embodiment of a valve 10 according to the present invention is shown. The valve 10 is a cartridge-style, normally closed, proportional flow control valve. In the illustrated embodiment, the valve 10 includes a tube assembly 12, a cage 14, and a solenoid coil 16. The tube assembly 12 is threadedly engaged with the cage 14. The solenoid coil 16 is mounted to the tube assembly 12. A coil nut 17 is threadedly engaged with a proximal end 18 of the tube assembly 12 to secure the solenoid coil 16 thereto.

The tube assembly 2 can include a plug portion 20, a hollow tube portion 21, and a hollow adapter 22 having a threaded external surface adjacent its distal end for threaded engagement with the cage 14. The cage 14 is hollow and cooperates with the tube portion 21 and the adapter 22 of the tube 12 to define a valve cavity 24. The tube assembly 12 can be formed as a brazed assembly of the plug portion 20, the tube portion 21, and the adapter 22. The cage 14 can be formed by any suitable manufacturing technique.

Disposed within the valve cavity 24, there is a non-magnetic residual washer 26, a plunger 28, a pilot pin 30, a first plunger spring 32 disposed between the residual washer 26 and the plunger 28, and a second plunger spring 34 disposed between the plunger 28 and the pilot pin 30. The residual washer 26 is disposed between the plug portion 20 of the tube 12 and a proximal end 36 of the plunger 28. The plunger 28 is disposed between the residual washer 26 and the pilot pin 30 and is reciprocally moveable within the valve cavity 24.

The first plunger spring 32 is operably arranged with the residual washer 26 and a first seat 38 defined within a longitudinally extending counter bore 39 at the proximal end 36 of the plunger 28. The first plunger spring 32 provides a biasing force which acts to urge the residual washer 26 against the plug portion 20 of the tube 12 and to urge the plunger 28 toward the cage 14 and the valve 10 to a closed position. A stop bushing 41 can be provided to limit the reciprocal movement of the plunger 28 and the pilot pin 30 toward the cage 14.

The second plunger spring 34 is operably arranged with the pilot pin 30 and a second seat 43 defined within a longitudinally extending counter bore 45 adjacent a distal end 47 of the plunger 28. The second plunger spring 34 provides a biasing force which acts to urge the pilot pin 30 toward a distal end 49 of the cage 14 and removes hysteresis caused by lost motion between the plunger 28 and the pilot pin 30.

The solenoid coil 16, the tube 12, the coil nut 17, and the plunger 28 comprise a solenoid assembly 52. The geometry and material properties of the plug portion 20 of the tube 12 and the plunger 28 determines the magnetic force characteristic of the solenoid assembly 52. The coil nut 17 provides additional contact area for magnetic flux. The solenoid assembly 52 has a proportional characteristic such that the magnetic attractive force between the tube 12 and the plunger 28 is proportional to the current applied to the solenoid coil 16. The non-magnetic residual washer 26 prevents the plunger 28 from latching to the tube 12 via residual magnetism.

The cage 14 includes an inlet port 60, an outlet port 62 and a load sense port 64 disposed between the inlet port 60 and the outlet port 62. The ports 60, 62, 64 communicate with the portion of the valve cavity 24 defined by the cage 14.

The inlet port 60 can include a plurality of cross-holes 70 disposed in spaced relationship to each other around the radial circumference of the cage 14. In the illustrated embodiment, the inlet port 60 includes eight cross-holes 70. The outlet port 62 can include an end outlet hole 72 and a plurality of cross-holes 74 disposed in spaced relationship to each other around the radial circumference of the cage 14. In the illustrated embodiment, the outlet port 62 includes eight cross-holes 74.

Referring to FIG. 2, the load sense port 64 can include a plurality of cross-holes 76 disposed in spaced relationship to each other around the radial circumference of the cage 14. In the illustrated embodiment, the load sense port 64 includes two cross-holes 76. A check ball 78 is disposed in each cross-hole 76 of the load sense port 64 and seats against the cage 14. A resiliently flexible ring 82 is placed radially outward from each check ball 78 to retain each check ball in position relative to its associated cross-hole 76 such that each check ball is movably retained within a recess 79 of the cage 14 to selectively prevent the flow of hydraulic oil through the cross-holes 76. The ring 82 includes a pair of roll pins 84 that are retentively engaged with the cage 14 to mount the ring 82 to the cage 14 and to prevent rotation of the ring 82 relative to the cage. When the valve 10 is inserted into a valve body cavity (not shown), the valve body and the cage 14 cooperate together to further retain each check ball 78.

Referring to FIG. 1, the outlet port 62 can be disposed at the distal end 49 of the cage 14. The inlet port 60 can be disposed near a proximal end 88 of the cage 14. The load sense port 64 can be disposed longitudinally between the inlet port 60 and the outlet port 62. A plurality of O-rings 90, 91, 92 and back up rings 94, 95 can be mounted to the external surface of the adapter 22 and the cage 14 to provide sealing between the ports 60, 62, 64 and limit external leakage.

A first poppet 98 and a second poppet 99 are disposed within the cage 14 such that the poppets 98, 99 are reciprocally movable therein over a predefined range of travel. The poppets 98, 99 define between them a load sense chamber 100 within the cage 14. The first poppet 98 is disposed adjacent the proximal end 88 of the cage 14. A first shoulder 102 defined within the interior of the cage limits the movement of the first poppet 98 toward the distal end 49 of the cage 14. The pilot pin 30 limits the movement of the first poppet 98 in the opposing direction.

The second poppet, also known as a reverse check flow poppet, is disposed adjacent the distal end 49 of the cage 14. A second shoulder 104 defined within the interior of the cage 14 limits the movement of the reverse check flow poppet 99 toward the proximal end 88 of the cage 14. An annular washer 108 can be provided at the distal end 49 of the cage 14 to act as a base for supporting a reverse flow check poppet spring 110. The washer 108 can be secured to the cage via a spring ring 112. The washer 108 limits the movement of the reverse check flow poppet 99 toward the distal end 49 of the cage. The reverse flow check poppet spring 110 provides a biasing force which acts to urge the reverse flow check poppet 99 toward the second shoulder 104. The reverse flow check poppet 99 includes a plurality of holes 114 therethrough. In the illustrated embodiment, the reverse flow check poppet 99 includes four holes 114.

The pilot pin 30 and the first poppet 98 cooperate to define a pilot cavity 118. The first poppet 98 includes a pair of pilot orifices 120, 121. The pilot pin 30 seats against the first poppet 98 such that the pilot pin 30 occludes one 120 of the pilot orifices to block the flow of hydraulic oil from the pilot cavity 118 to the load sense port 64 when the solenoid coil 16 is de-energized.

In the closed position as shown in FIG. 1, a distal end 124 of the first poppet 98 is seated on the first shoulder 102 of the cage 14 and blocks the flow of hydraulic oil from the input port 60 to the load sense port 64 when the valve 10 is de-energized. The geometry of the first poppet 98 establishes the valve flow characteristic relative to the poppet lift position.

The stop bushing 41 can prevent damage to the pilot pin 30 in situations where the first poppet 98 is opened abruptly, such as when a void (or air pocket) exists in the tube 12 when the valve 10 is quickly pressurized at the input port 60.

The reverse flow check poppet 99 allows flow of hydraulic oil to the outlet port 62 once the spring force of the reverse flow check poppet spring 110 is overcome, but prevents flow from the outlet port 62 into the load sense chamber 100. The check spring 110 can ensure the check poppet 99 closes at low pressure.

The check balls 78 block the flow of hydraulic oil through the load sense port 64 when the pressure at the load sense port 64 is higher than the pressure inside the load sense chamber 100 of the cage 14 between the pair of poppets 98, 99 disposed therein.

The valve 10 can be used to control the flow of hydraulic oil to a cylinder, hydraulic motor, or other hydraulic device, for example, in proportion to the amount of current applied to the coil 16. With the solenoid coil 16 de-energized, the valve 10 blocks the flow of hydraulic fluid to all ports 60, 62, 64. When current is applied to the solenoid coil 16, the valve 10 opens to allow the flow of hydraulic fluid from the input port 60 to the output port 62 and the load sense port 64. The valve 10 opens in an amount proportional to the amount of current applied to the solenoid coil 16. The flow of hydraulic oil from the output port can be used to control a cylinder, hydraulic motor or other hydraulic device, for example. The flow of hydraulic oil from the load sense port 64 can be used to pilot another valve, for example.

When the valve 10 is de-energized with the pressure at the input port 60 exceeding the pressure at the output port 62, hydraulic oil enters the pilot cavity 118 through one 121 of the orifices in the first poppet 98 and creates a force imbalance which drives the first poppet 98 into the seat of the cage 14 and blocks the flow of hydraulic oil from the input port 60 to the output port 62 and the load sense port 64. As current is applied to the solenoid coil 16, a magnetic force is established between the tube 12 and the plunger 28, pulling the plunger 28 toward the tube 12. As the plunger 28 moves, so does the pilot pin 30. The movement of the pilot pin 30 allows a flow of hydraulic oil to exit the pilot cavity 118 into the load sense chamber 100. As the exit flow from the pilot cavity 118 exceeds the flow entering through the poppet orifice 121, the pilot cavity 118 pressure is reduced. A sufficient reduction in the pressure within the pilot cavity 118 causes the poppet forces to balance and eventually reverse so that the first poppet 98 opens, i.e., move away from the shoulder 102 of the cage 14 toward the plunger 28. When the first poppet 98 opens, hydraulic oil flows from the input port 60 into the load sense chamber 100 toward the output port 62 and the load sense port 64.

When the pressure in the load sense chamber 100 between the poppets 98, 99 is high enough to overcome the biasing force of the check spring 110, the check poppet 99 will move away from the shoulder 104 of the cage 14 and hydraulic oil will flow from the load sense chamber 100 to the outlet port 62. If the pressure at the outlet port 62 is higher than the pressure in the load sense chamber 100 between the two poppets 98, 99, the spring loaded check poppet 99 prevents the flow of hydraulic fluid in the reverse direction from the outlet port 62 into the load sense chamber 100. Likewise, if the pressure at the load sense port 64 is higher than the pressure in the load sense chamber 100 between the poppets 98, 99, the check balls 78 prevent the flow of hydraulic fluid in from the load sense port 64 into the load sense chamber 100.

In other embodiments, the valve can include a pilot pin spring disposed between the pilot pin 30 and the first poppet 98 in the pilot cavity 118. The pilot pin spring can assist the opening/lifting operation of the pilot pin 30 wherein the pilot pin 30 disengages from the first poppet 98 to allow a flow of hydraulic oil through the pilot orifice 120. The pilot spring pin can also assist in urging the first poppet 98 to an engaged position wherein it is seated upon the first shoulder 102 of the cage 14. In yet other embodiments, the check balls disposed in each cross-hole of the load sense port 64 can be omitted.

Accordingly, the novel valve of the invention can provide integral load holding capability with only one leak path at the outlet port 62 and provide a pilot signal integral to the valve. In comparison, poppet valves with similar load holding capability known to the art have multiple leak paths and typically require an unserviceable soft seal on the poppet. Additionally, the novel valve can include a reverse flow poppet that is spring loaded, and flow priority can be established in systems with multiple loads by changing or adjusting the spring preload. The novel valve with integral load holding poppet and pilot signal eliminates the need and associated cost for external inline check valves.

The following examples further illustrate the invention but, of course, should not be construed as in any way limiting its scope.

EXAMPLE 1

Figure 4:
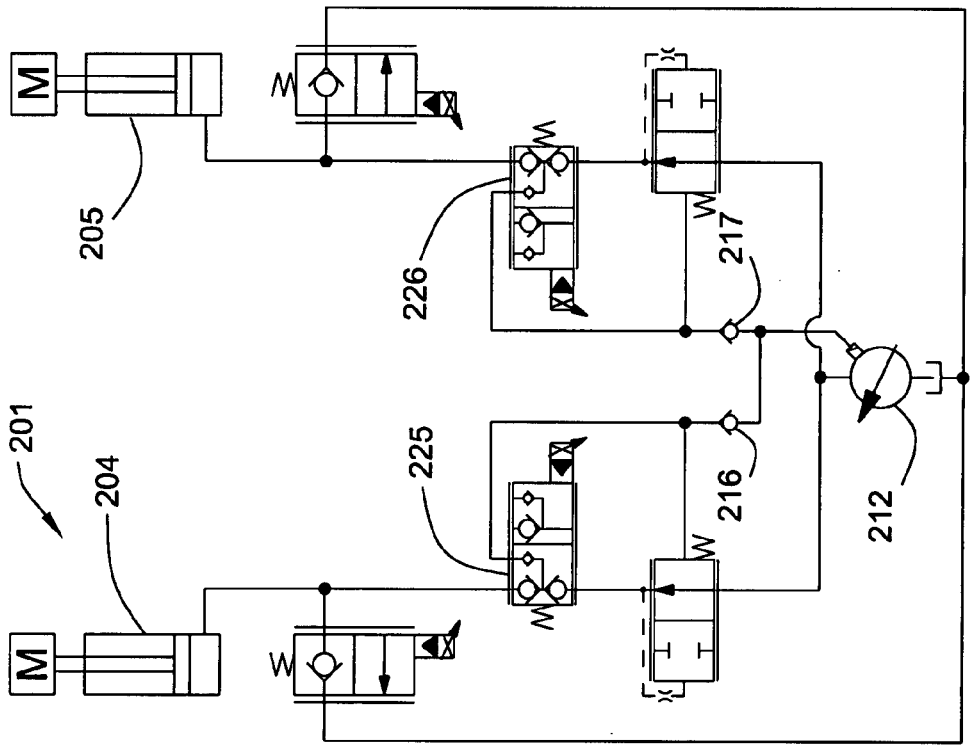
FIG. 4 is a diagram of a proportional bridge circuit to control a cylinder and having a load sense feature that is shown with a pair of valves constructed in accordance with an embodiment of the present invention.
Figure 3:
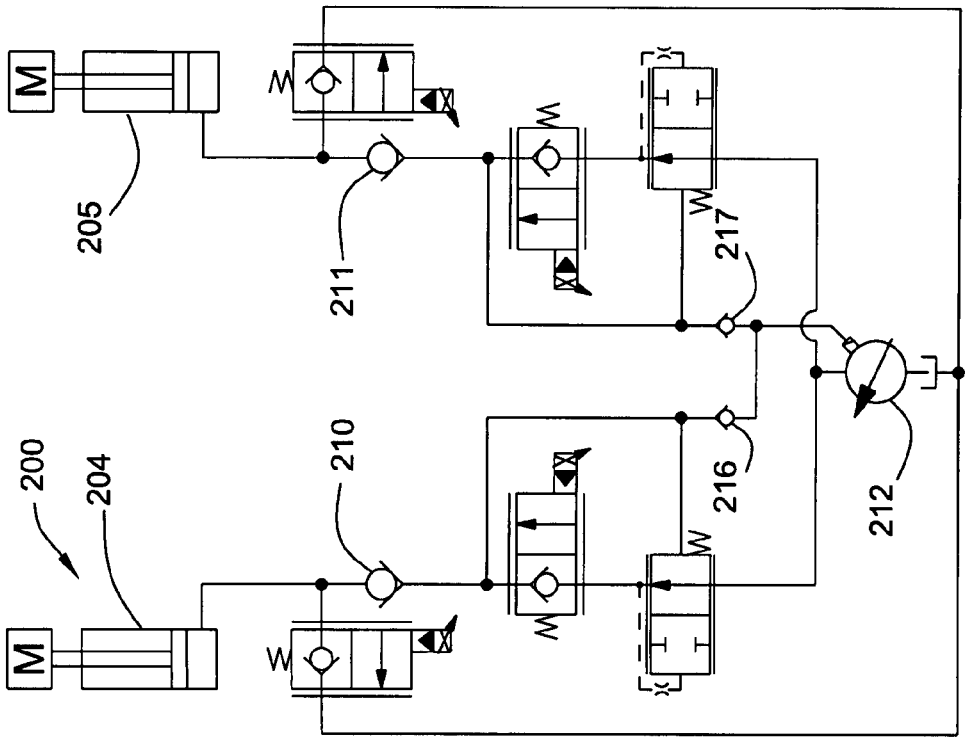
FIG. 3 is a diagram of a conventional proportional bridge circuit to control a cylinder and having a load sense feature that is shown with a pair of load holding checks, a pair of load sense checks, and four proportional poppet valves.

In one aspect, an embodiment of the invention can be used to simplify load sense circuits. FIG. 3 and FIG. 4 illustrate proportional bridge circuits 200, 201 (using standard ISO symbols) that are controlling a pair of cylinders 204, 205. In FIG. 3, a pair of load holding checks 210, 211 is provided to prevent the load from moving and to allow the pump 212 to return to a standby setting. A pair of load sensing checks 216, 217 is provided to isolate the pump signal line depending on which branch of the circuit 200 is being used.

In comparison, the circuit 201 of FIG. 4 uses a pair of valves 225, 226 constructed in accordance with an embodiment of the invention, which permits the removal of the load holding checks 210, 211. Therefore, FIG. 4 shows the benefits of the embodiment, which reduces the number of cartridges from ten in the conventional circuit 200 shown in FIG. 3 to eight in the circuit 201 of FIG. 4.

EXAMPLE 2

Figure 6:
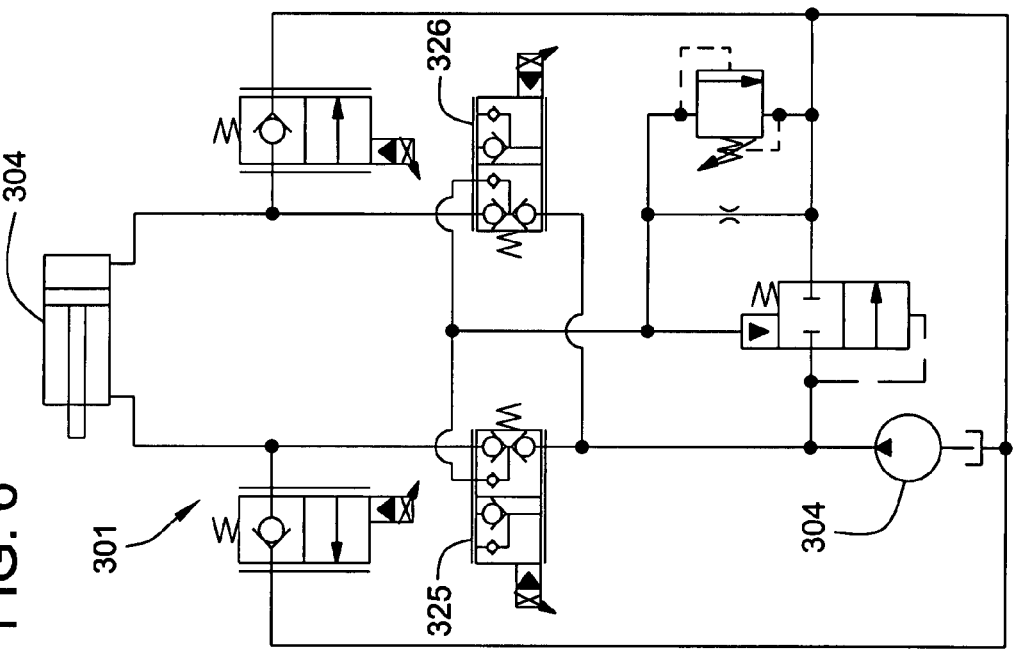
FIG. 6 is a diagram of a proportional bridge circuit to control a cylinder and having an unloading feature to unload a fixed displacement pump that is shown with a pair of valves constructed in accordance with an embodiment of the present invention.
Figure 5:
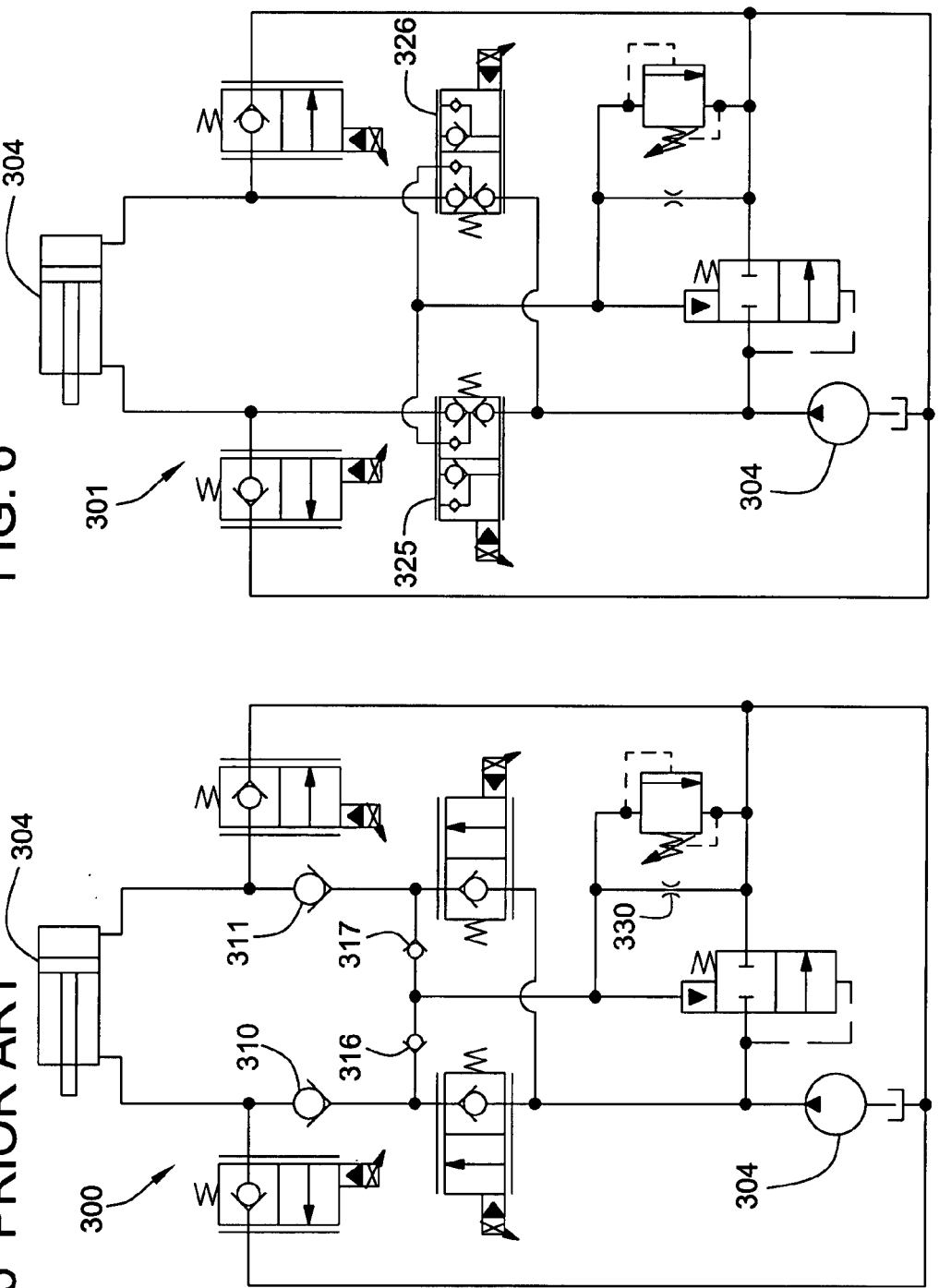
FIG. 5 is a diagram of a conventional proportional bridge circuit to control a cylinder and having an unloading feature to unload a fixed displacement pump that is shown with a plurality of load holding checks.

In another aspect, an embodiment of the invention can be used to simplify an unloading circuit. FIG. 5 and FIG. 6 illustrate proportional bridge circuits 300, 301 (using standard ISO symbols) that are controlling a cylinder 304 using an unloading feature to unload a fixed displacement pump 304. In FIG. 5, a pair of load holding checks 310, 311 are provided to prevent the load from moving. A pair of load sensing checks 316, 317 is provided to isolate the pump signal line depending on which branch of the circuit 300 is being used. A bleed orifice 330 allows the pump to be placed in a standby setting.

In comparison, the circuit 301 of FIG. 6 uses a pair of valves 325, 326 constructed in accordance with an embodiment of the invention, which permits the removal of load holding and sensing checks 310, 311, 316, 317. Therefore, FIG. 6 shows the benefits of the embodiment, which reduces the number of cartridges from eight in the conventional circuit 300 shown in FIG. 5 to four in the circuit 301 of FIG. 6.

EXAMPLE 3

Figure 7:
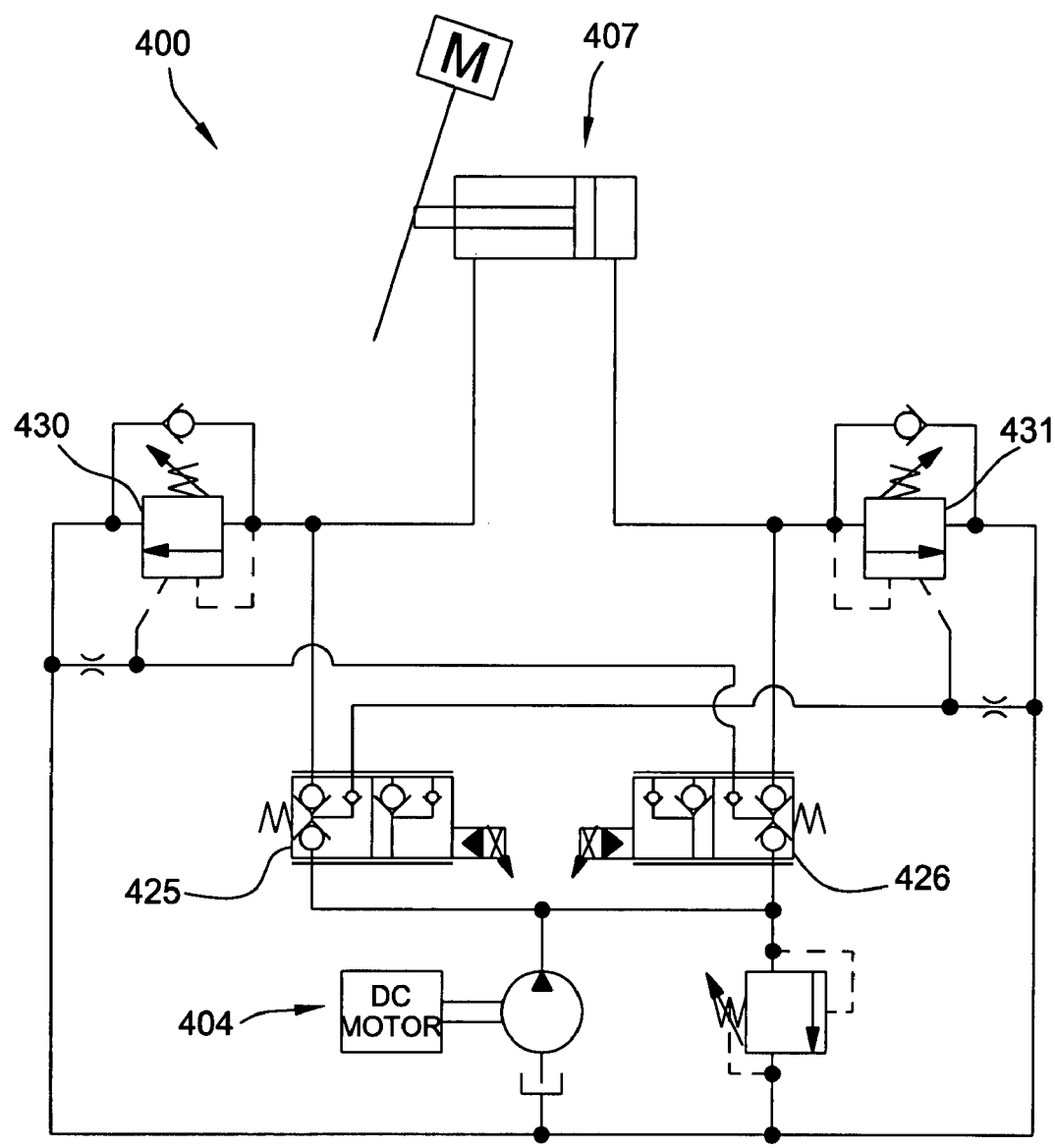
FIG. 7 is a proportional bridge circuit of a DC motor/pump application driving an overrunning load that is shown with a pair of valves constructed in accordance with an embodiment of the present invention.

In yet another aspect, an embodiment of the invention can be used to simplify motor circuits. FIG. 7 illustrates an example of a circuit 400 for a DC motor/pump 404 driving an overrunning load 407. In this example, a pair of valves 425, 426 constructed in accordance with an embodiment of the invention is used to send a signal to the counter balance valves 430, 431 so that the load does not overrun the available pump supply.

Although the disclosure has been described with reference to specific embodiments, these descriptions are not meant to be construed in a limiting sense. Various modifications of the disclosed embodiments, as well as alternative embodiments of the disclosure will become apparent to persons skilled in the art upon reference to the description of the disclosure. It should be appreciated by those skilled in the art that the conception and the specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. It is therefore, contemplated that the claims will cover any such modifications or embodiments that fall within the true scope of the disclosure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and do not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve comprising:
   (a) a tube body having a first port through which fluid enters and leaves the three-way valve, and the tube body including a tube body threaded section;
   (b) a cage body having a second port and a third port through which fluid enters and leaves the three-way valve, and the cage body including a cage body threaded section which allows a threaded interface for an operative connection to the tube body threaded section;
   (c) a solenoid coil secured to the tube body for generating a magnetic flux field;
   (d) a plunger located inside the tube body having a magnetic characteristic which allows proportional movement upon interaction with the magnetic flux field of the solenoid coil;
   (e) a tube spring located between the tube body and the plunger for opening and closing the valve;
   (f) a non-magnetic residual washer located between the tube and the plunger which prevents latching due to residual magnetism;
   (g) a pilot pin located adjacent to the plunger;
   (h) a plunger spring located between the plunger and the pilot pin;
   (i) a first poppet selectively engaging the cage to control flow of fluid between the first port and at least the second port;
   (j) a second poppet selectively engaging the cage to control flow of fluid with at least the third port;
   (k) a check spring connecting to the second poppet to allow the second poppet to close; and
   wherein the second port comprises an intermediate pilot port.

2. The valve of claim 1 wherein the check spring is preloaded to allow flow priority.

3. The valve of claim 1 wherein the valve is further characterized as having a single leak path at the first port.

4. The valve of claim 3 wherein the valve is zero leak.

5. The valve of claim 1 further comprising a check ball located adjacent to the cage to control flow from the second port.

6. The valve of claim 1 wherein the solenoid coil is secured to the tube body via a coil nut.

7. The valve of claim 1 wherein the plunger spring operates to keep the pilot pin biased to the plunger.

8. The valve of claim 1 further comprising a stop bushing for limiting the movement of the plunger and the pilot pin toward the cage.

9. A method of operating an integral three-way poppet valve with intermediate pilot port and load holding capability comprising: flowing hydraulic oil to a three-way valve having one inlet port and two outlet ports, and applying electrical current to a solenoid coil attached to the three-way valve to regulate the flow of oil from the inlet port on the valve the outlet ports on the valve, wherein the flow from one of the outlet ports is used as a pilot signal and the flow from the other of the outlet ports is used to control a hydraulic device, and wherein the three-way valve comprises:
   (a) a tube body having a first port through which fluid enters and leaves the three-way valve, and the tube body including a tube body threaded section;
   (b) a cage body having a second port and a third port through which fluid enters and leaves the three-way valve, and the cage body including a cage body threaded section which allows a threaded interface for an operative connection to the tube body threaded section;
   (c) a plunger located inside the tube body having a magnetic characteristic which allows proportional movement upon interaction with a solenoid coil field;
   (d) a tube spring located between the tube body and the plunger for opening and closing the valve;
   (e) a non-magnetic residual washer located between the tube and the plunger which prevents latching due to residual magnetism;
   (f) a pilot pin located adjacent to the plunger;
   (g) a plunger spring located between the plunger and the pilot pin;
   (h) a first poppet selectively engaging the cage to control flow of fluid between the first port and at least the second port;
   (i) a second poppet selectively engaging the cage to control flow of fluid with at least the third port;
   (j) a check spring connecting to the second poppet to allow the second poppet to close.

10. The method of claim 9 wherein the valve further comprises a check ball located adjacent to the cage to control flow from the second port.

11. The method of claim 10 wherein the flow of oil is regulated based on the current applied such that the valve either blocks all flow or permits flow proportional to the current applied.

12. The method of claim 9 wherein the hydraulic device controlled comprises at least a cylinder, a hydraulic motor, or a combination thereof.

13. The method of claim 9 wherein the pilot signal comprises a load sense signal to actuate a load sense pump or other pump control.

14. The method of claim 9 wherein the pilot signal pilots another valve.

15. A zero leak integral three-way valve with intermediate pilot port and load holding capability comprising:
   (a) a tube body having a first port through which fluid enters and leaves the three-way valve, and the tube body including a tube body threaded section;
   (b) a cage body having a second port and a third port through which fluid enters and leaves the three-way valve, and the cage body including a cage body threaded section which allows a threaded interface for an operative connection to the tube body threaded section;
   (c) a solenoid coil secured to the tube body for generating a magnetic flux field;
   (d) a plunger located inside the tube body having a magnetic characteristic which allows proportional movement upon interaction with the magnetic flux field of the solenoid coil;
   (e) a tube spring located between the tube body and the plunger for opening and closing the valve;
   (f) a non-magnetic washer located between the tube and the plunger which prevents latching due to residual magnetism;
   (g) a pilot pin located adjacent to the plunger;
   (h) a plunger spring located between the plunger and the pilot pin operatively keeping the pilot pin biased to the plunger;
   (i) a first poppet selectively engaging the cage to control flow of fluid between the first port and the second port;
   (j) a second poppet selectively engaging the cage to control flow of fluid with the third port;
   (k) a check spring connecting to the second poppet to allow the second poppet to close;
   wherein the second port is the intermediate pilot port.

16. The three-way valve of claim 15 wherein the check spring is preloaded to allow flow priority.

17. The three-way valve of claim 15 further comprising a check ball located adjacent to the cage to control flow from the second port.

18. The three-way valve of claim 15 further comprising a stop bushing for limiting the reciprocal movement of the plunger and the pilot pin toward the cage.

* * * * *